Figure 1:
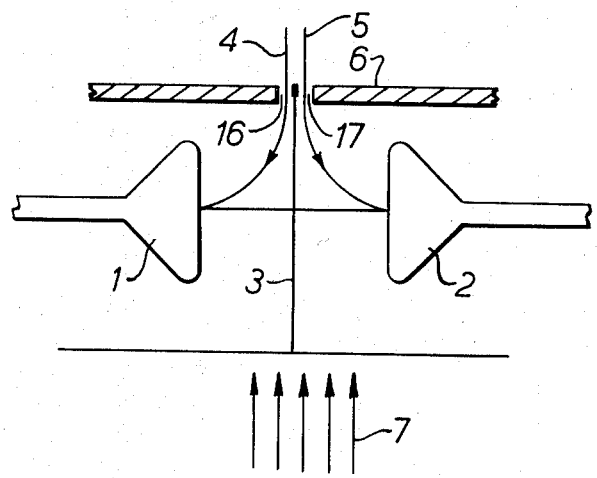

Jan. 25, 1966             N. R. DALY             3,231,736
MASS SPECTROMETER DETECTOR FOR COLLECTING IONS OF
SIMILAR BUT DIFFERENT MASSES
Filed May 20, 1963                                     2 Sheets-Sheet 1

3,231,736
MASS SPECTROMETER DETECTOR FOR COLLECTING IONS OF SIMILAR BUT DIFFERENT MASSES
Norman Richard Daly, Woodley, Reading, England, assignor to United Kingdom Atomic Energy Authority, London, England
Filed May 20, 1963, Ser. No. 281,657
Claims priority, application Great Britain, May 29, 1962, 20,582/62
5 Claims. (Cl. 250—41.9)

This invention relates to ion beam intensity measurement devices and it is applicable in particular to the simultaneous measurement of the intensities of two ion beams in a mass spectrometer.

Ion beam intensity measurement devices for simultaneously measuring the intensities of two ion beams in mass spectrometers have already been proposed, but they suffer from the fact that they cannot be used with low intensity ion beams separated by only a small distance. In the analysis of materials by mass spectrometry the samples available may be very small, $10^{-9}$ gms. or less. With such small quantities available, the ion beam is of low intensity and its intensity can fall significantly while the mass spectrometry measurements are carried out thereby decreasing the accuracy of the measurements.

As is well known, isotopes each form their own characteristic ion beam in mass spectrometers. With mass spectrometers currently available it is quite common for the beam separation to be only 0.06 inch for a difference of one mass unit in 180 mass units. This small separation has prevented the use of any of the known sensitive detection devices and as a result therefore the advantages of mass spectrometry techniques have not been fully available for the analysis of many common types of sample material.

This invention provides an ion beam intensity measurement device which overcomes the above problems.

The invention consists in an ion beam intensity measurement device comprising two chambers separated by a partition forming an electrostatic boundary, each chamber having an inlet for admitting one ion beam to one chamber and a different ion beam to the other chamber, an electrode means in each chamber for deflecting the ion beam in that chamber and accelerating it in a direction away from the said partition, a target in each chamber in the path of the ion beam, said target being adapted to produce secondary electrons upon bombardment by the said ion beam, means for generating a magnetic field in each of the said chambers to deflect the said secondary electrons into a direction such that they do not strike the said partition, and means in the paths of the said deflected secondary electrons for mounting detecting and measuring devices for the said secondary electrons.

An embodiment of the invention is illustrated in the drawing of which

Figure 2:
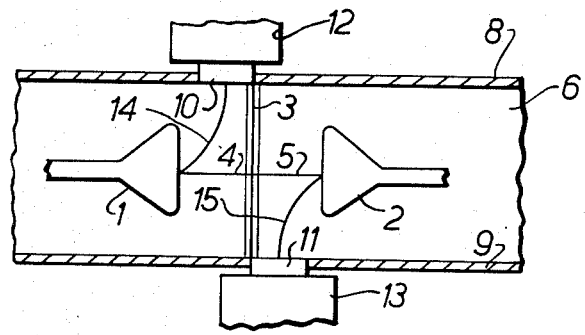

FIGURE 1, which accompanied the provisional specification, is a plan,

FIGURE 2, which accompanied the provisional specification, is an elevation and

Figure 3:
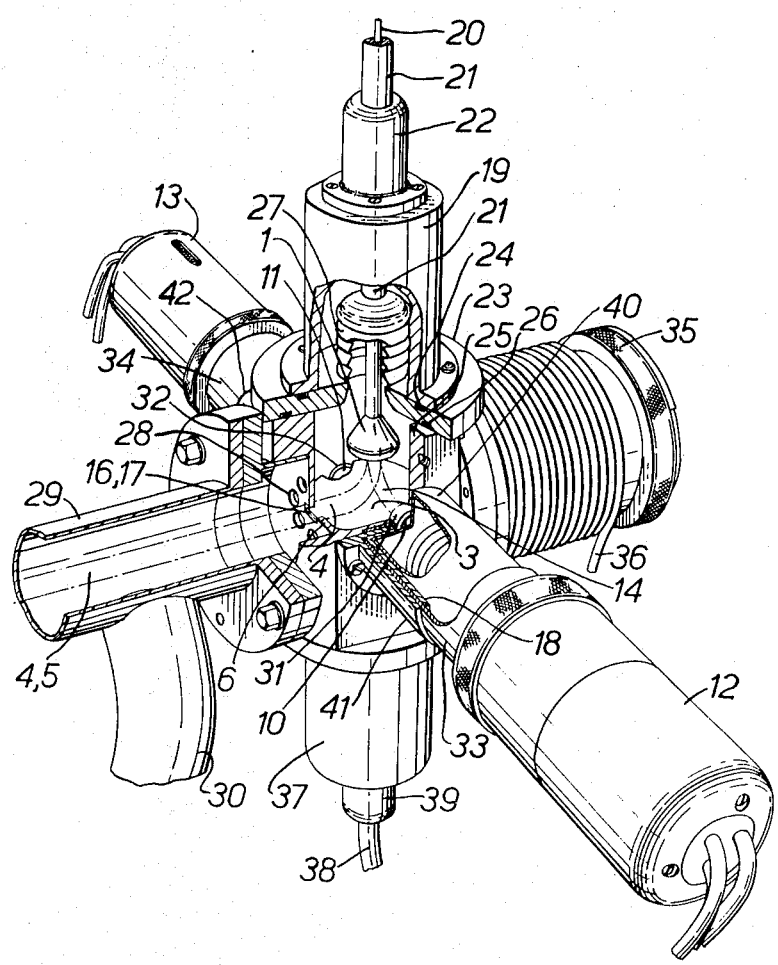

FIGURE 3, which accompanies this specification is a cutaway perspective drawing.

In FIGURES 1 and 2, two electrodes 1 and 2, held at 30 kv., are positioned on either side of a thin partition 3 and two positive ion beams 4 and 5 pass through two fine slits 16 and 17 in a wall 6 on either side of this partition. The beams are attracted by and accelerated to the electrodes, striking them with increased velocity at the center where they release secondary electrons 14 and 15. The electrons would then normally strike the thin partition and be lost, but a magnetic field in the direction shown by the arrows 7 in FIGURE 1 is used to bend the electrons round so that the two electron streams move towards opposite walls 8 and 9 of the detector chamber (FIGURE 2). Discs of plastic phosphor 10 and 11 are placed at these points where the electron beams would otherwise strike, and the light produced is recorded with photomultiplier tubes 12 and 13.

In FIGURE 3 the ion beam intensity measurement device is suitable for use on a mass spectrometer producing an ion beam, of about 5 kev. energy and having a beam deflection radius in the mass spectrometer magnetic field of 12 inches. It will be apparent that mere workshop alterations in the design are required to make it suitable for other models of mass spectrometer.

Electrode 1 is made of stainless steel and has an optically flat surface of mirror finish for bombardment by beam 4. Electrode 1 is screwed into a tapped metal rod (not visible) passing through glass seal 27. High tension lead 20 having a plastic insulator 21 is held by a connector 22 screwed to cover 19, and makes electrical connection with electrode 1 via the metal rod which passes through seal 27. Cover 19 is filled with oil and screwed to a thick plate 23, sealing therebetween being aided by O-ring seal 24. Plate 23 is screwed to a body 25, sealing therebetween being aided by O-ring seal 26.

Glass seal 27 is sealed at one end to plate 23, and at the other end to the metal rod and provides a vacuum seal.

Body 25 has a wall 6 containing pumping holes 28 and parallel slits 16 and 17 for admitting ion beams 4 and 5 respectively. Slits 16 and 17 are separated by a distance corresponding to the separation of the ion beams. A stainless steel partition 3, of thickness less than the separation of the ion beams, extends wholly across the center of body 25.

Tube 29, having a vacuum pump connection 30 forms a connection with a mass spectrometer (not shown).

An organic phospor 10 is mounted in a soft iron tube 31 inserted in body 25. Tube 31 acts as a screen to produce a field free region in front of phosphor 10. Organic phosphor 11 is similarly mounted in a soft iron tube 32.

Photomultipliers 12 and 13 are provided with aluminium cans 33 and 34 fitting in sockets 41 and 42. Photomultiplier 12 has a soft iron shield 18 surrounding the end of its glass envelope 40, the shield having a window defined by soft iron tube 31. Photomultiplier 13 is similarly provided with shielding. Good light coupling between the photomultipliers and the phosphors is achieved by the use of silicone oil. A thin aluminium layer is deposited on the front face of each phosphor to ground the phosphor and give good reflection of photons produced therein. This layer is transparent to the secondary electrons generated at the electrodes 1 and 2 (2 not being visible).

An iron-cored electromagnet 35 provides a magnetic field in the plane of the partition 3. It is provided with cooling coils 36.

Cover 37, opposite cover 19, is identical therewith and houses electrode 2 which is provided with vacuum seals in the same manner as electrode 1. Lead 38 is held by a connector 39 similar to connector 22.

In operation ion beams 4 and 5, of energy 5 kev., are adjusted to pass through slits 16 and 17. Beam 4 is bent upwards by the attraction of electrode 1 and beam 5 is bent downwards by electrode 2, the electrodes being at 35 kv. negative potential.

The ions are thereby accelerated and produce secondary electrons in good yield. The electrons are accelerated away from the electrodes and their path is governed by the applied magnetic field. This field is adjusted to bring the secondary electrons to the center of the phosphors 10 and 11 where they generate photons. The magnetic field is not strong enough to produce significant deflection of the ion beams. The voltage pulses from the photomultipliers are fed to the normal amplifiers and scalers.

Thus one can look at two beams simultaneously, e.g. U235, U238 and the fact that the sample decays rapidly, will not interfere with the precision of the measurement. Normally one would hope to count the ions, or one could use the beams to charge two condensors and get the isotopic ratio by comparison of charges.

Investigation has indicated that the application of the magnetic field does not result in significant errors in ion counting.

Focussing of the two electron streams involved has been investigated by turning the ion beam intensity up to a value where visual images were available to study. The ion beams were narrow ribbons of cross section 6 mm. x 0.020 inch. The electron images produced at the phosphors were circular and approximately 2–3 mm. in diameter. Thus one can say no ions are lost due to defocussing of the electron images. Furthermore no significant variation in relative intensity of the secondary electron beams results from beam positional instability. This is of great importance in maintaining accuracy of measurement.

I claim:

1. In a mass spectrometer, an ion beam intensity measuring system for measuring simultaneously the intensity of ions of two similar but different masses contained in an ion beam separated by the mass spectrometer into two discrete ion beams, comprising two chambers separated by an electrically conducting partition forming an electrostatic screen between the chambers, each chamber having an inlet for admitting one of said ion beams to said chamber, electrode means positioned within each chamber to deflect the ion beam entering that chamber in a direction away from the partition, target means located within each chamber to intercept the deflected ion beam in that chamber, said target means being adapted to generate secondary electrons upon bombardment by said ion beam, means for establishing in each chamber a magnetic field to deflect the secondary electrons into a direction avoiding contact with said partition, and means located in the paths of the deflected secondary electrons in each chamber for detecting said secondary electrons.

2. In a mass spectrometer, an ion beam intensity measuring system as claimed in claim 1 wherein the magnetic field in each chamber is arranged to be substantially parallel to the direction of the ion beam before deflection by said electrode means.

3. In a mass spectrometer, an ion beam intensity measuring system as claimed in claim 1 wherein the electrode means in each chamber forms the target in said chamber.

4. In a mass spectrometer, an ion beam intensity measuring system as claimed in claim 3 wherein each electrode has a susbtantially flat target surface arranged substantially parallel to said partition.

5. In a mass spectrometer, an ion beam intensity measurement system for measuring simultaneously the intensity of ions of two similar but different masses contained in an ion beam separated by the mass spectrometer into two discrete ion beams, comprising two chambers seaprated by an electrically conducting partition forming an electrostatic screen between the chambers, each chamber having an inlet adjacent to the partition for admitting one of said ion beams to said chamber, each chamber containing an electrode arranged to deflect the ion beam entering that chamber away from said partition towards said electrode and adapted to generate secondary electrons when bombarded by said ion beam, means for establishing in said chambers a magnetic field parallel to the direction of the ion beams prior to deflection by said electrodes to deflect the secondary electrons generated at each electrode to two discrete measuring positions, and means located at said positions for detecting the secondary electrons from the respective electrodes.

References Cited by the Examiner
UNITED STATES PATENTS

| | | | |
|---|---|---|---|
| 2,541,656 | 2/1951 | Long | 250—41.9 |
| 2,769,911 | 11/1956 | Warmoltz | 250—41.9 |
| 2,901,620 | 8/1959 | Barnes | 250—41.9 |

FOREIGN PATENTS

| | | |
|---|---|---|
| 144,559 | 11/1960 | Russia. |

RALPH G. NILSON, *Primary Examiner.*

W. F. LINDQUIST, *Assistant Examiner.*